(12) United States Patent
Park

(10) Patent No.: US 10,046,742 B2
(45) Date of Patent: Aug. 14, 2018

(54) METHOD AND APPARATUS FOR PREVENTING SENSITIVE BRAKE OF VEHICLE

(71) Applicant: Hyundai Motor Company, Seoul (KR)

(72) Inventor: Deok Ho Park, Suwon-Si (KR)

(73) Assignee: Hyundai Motor Company, Seoul (KR)

( * ) Notice: Subject to any disclaimer, the term of this patent is extended or adjusted under 35 U.S.C. 154(b) by 462 days.

(21) Appl. No.: 14/951,429

(22) Filed: Nov. 24, 2015

(65) Prior Publication Data

US 2016/0297409 A1 Oct. 13, 2016

(30) Foreign Application Priority Data

Apr. 9, 2015 (KR) .......................... 10-2015-0050043

(51) Int. Cl.
 *B60T 8/172* (2006.01)
 *G06F 19/00* (2018.01)
 *F16D 63/00* (2006.01)
 *B60T 8/48* (2006.01)

(52) U.S. Cl.
 CPC ............. *B60T 8/172* (2013.01); *B60T 8/4872* (2013.01); *B60T 2201/03* (2013.01); *F16D 63/008* (2013.01)

(58) Field of Classification Search
 CPC ..... B60T 8/172; B60T 8/4872; B60T 2201/03
 USPC ........................ 701/36, 29.1, 70, 71; 303/124
 See application file for complete search history.

(56) References Cited

U.S. PATENT DOCUMENTS

| 6,409,289 B2 * | 6/2002 | Wagner ..................... B60T 8/00 303/1 |
| 6,671,604 B1 * | 12/2003 | Frentz ....................... B60T 8/00 180/197 |
| 7,320,506 B2 * | 1/2008 | Fagergren ................. B60T 8/00 188/1.11 R |

FOREIGN PATENT DOCUMENTS

| JP | 2000-344078 A | 12/2000 |
| JP | 2004-230908 A | 8/2004 |
| JP | 2007-230480 A | 9/2007 |
| KR | 1998-061860 U | 11/1998 |
| KR | 1999-0026520 U | 7/1999 |
| KR | 20-1999-0042005 | 12/1999 |
| KR | 10-1021520 B1 | 3/2011 |
| KR | 10-2011-0038511 | 4/2011 |

* cited by examiner

*Primary Examiner* — Gertrude Arthur Jeanglaude
(74) *Attorney, Agent, or Firm* — Morgan, Lewis & Bockius LLP

(57) ABSTRACT

A method of preventing a sensitive brake for preventing an excessive brake of a vehicle may include measuring conditions for determining a sensitive brake environment of a vehicle, terminating a brake when the conditions measured do not correspond to a preset sensitive brake environment, and when the conditions correspond to the sensitive brake environment, controlling a brake apparatus of the vehicle to be operated in a sensitive brake preventing mode, executing a first brake in a sensitive brake mode, comparing whether a value of an index of deceleration to a pedal effort at the first brake executed in the sensitive mode is larger than a predetermined value, and terminating the brake when the value of the index is smaller than the predetermined value, and repeatedly performing the brake in the sensitive brake mode when the value of the index is larger than the predetermined value.

7 Claims, 4 Drawing Sheets

METHOD AND APPARATUS FOR PREVENTING SENSITIVE BRAKE OF VEHICLE

CROSS-REFERENCE TO RELATED APPLICATION

The present application claims under priority to Korean Patent Application No. 10-2015-0050043 filed Apr. 9, 2015, the entire contents of which is incorporated herein for all purposes by this reference.

BACKGROUND OF THE INVENTION

Field of the Invention

The present invention relates to a method of preventing sensitive brake of a vehicle, and more particularly, to a method of preventing a sensitive brake of a vehicle, which adjusts oil pressure of a brake caliper in next brake based on an index calculated by measuring a braking speed of a vehicle, and prevents a sensitive brake.

The present invention also relates to an apparatus for preventing a sensitive brake of a vehicle for implementing the method of preventing a sensitive brake.

Description of Related Art

In general, a disk brake of a vehicle includes a caliper, which includes a brake disk rotating while being integrated with a vehicle wheel, a pad generating frictional force while being in close contact with a disk, a wheel cylinder to which oil pressure is applied, a piston reciprocating inside the cylinder and pushing the pad, and a cylinder, as a main element.

When a driver steps on a brake pedal in order to decelerate or stop a vehicle while travelling, the disk brake of the vehicle pushes the piston within a master cylinder and forcibly transfers a brake liquid to a wheel cylinder by the force of the stepped on corresponding brake pedal to generate oil pressure, and the pressurized oil of the brake liquid flows into the corresponding wheel cylinder through a brake pipe to break the piston in left and right sides, so that a brake shoe is pushed against a brake drum to generate braking force, and when the driver takes his/her foot off the brake pedal, the oil pressure within the corresponding master cylinder deteriorates, so that the corresponding brake shoe returns to an original position by restoration force of a return spring, and the brake liquid within the corresponding wheel cylinder returns to the corresponding master cylinder, so that the braking force is released.

The brake apparatus exhibits a sensitive brake effect, in which excessive braking force is applied, when the vehicle travels after being parked during the night time, and the sensitive brake effect is generated because humidity of a friction material is increased during the night time according to a characteristic of the friction material and a frictional coefficient is abnormally increased to implement excessive braking force. However, when the driver repeatedly brakes several times, a temperature of a brake system is increased and the humidity of the friction material is returned to a normal state, so that the sensitive brake effect disappears.

The sensitive brake effect may degrade a ride quality of a passenger and generate noises, and has a concern in causing a collision accident by a rear vehicle due to a sudden brake, so that it is necessary to prevent the generation of the sensitive brake effect.

The prior art discloses technology, in which a function of turning off an ignition switch while a travel driving source of a vehicle is stopped and there is no brake operation of a driver of the parked vehicle, or operating a service brake while each of the conditions that a gear shift is a P range and a stop lamp switch is turned off is added to a brake apparatus for a vehicle, so that the brake apparatus is left so that the amount of moisture absorbed by a friction material is decreased, and then a sensitive brake of the brake generated while braking the vehicle (particularly, a brake at an initial start) is suppressed.

However, in reality, it is difficult to accurately measure the amount of moisture absorbed by the friction material.

Prior art discloses a method and an apparatus for re-adjusting friction, in which a service brake shaped like a drum or a disk, a secondary brake, a control device for distributing braking force demanded between the service brake and the secondary brake, and an apparatus for re-adjusting a friction material forming a part of the service brake are provided to a vehicle.

However, the control device for distributing braking force needs to be further provided in order to re-adjust the friction force of the friction material in the patent technology, so that there is a problem in that manufacturing cost is increased, and the control device needs to be additionally managed and maintained in an optimum state in order to accurately distribute braking force.

Further prior art discloses an apparatus for removing moisture of a brake system including a heating substance operated for a predetermined time to generate heat to a friction material of a brake system, which is compressed against a brake drum or a disk while braking to generate braking force, in order to remove moisture or water by heating the friction material by heat generated from the heating substance when a vehicle is traveled after being parked for a long time in winter season or being washed.

However, there is a problem in that the additional heating substance is included in order to remove moisture or water of the friction material to increase costs, and it is difficult to install the heating substance in the brake apparatus due to a limitation in a small space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of preventing a sensitive brake of a vehicle, which detects an outdoor temperature, a relative humidity of the outdoor, a parking time, a temperature of a disk, and the like, determines that a sensitive brake is to be generated when a condition of the generation of the sensitive brake is satisfied, and exhibits braking force in a jump-in section decreased compared to typically generated braking force in a jump-in section of a brake by a brake caliper in response to a pedal effort of a driver.

Various aspects of the present invention are additionally directed to providing an apparatus for preventing a sensitive brake of a vehicle, which exhibits decreased jump-in braking force in a sensitive brake environment.

According to various aspects of the present invention, a method of preventing a sensitive brake for preventing an excessive brake of a vehicle may include measuring conditions for determining a sensitive brake environment of the vehicle, terminating a brake when the conditions measured do not correspond to a preset sensitive brake environment, and when the conditions correspond to the sensitive brake environment, controlling a brake apparatus of the vehicle to be operated in a sensitive brake preventing mode, executing a first brake in a sensitive brake mode, comparing whether a value of an index of deceleration to a pedal effort at the first brake executed in the sensitive mode is larger than a predetermined value, and terminating the brake when the value of the index is smaller than the predetermined value, and repeatedly performing the brake in the sensitive brake mode when the value of the index is larger than the predetermined value.

The conditions for determining the sensitive brake environment may be determined according to whether measured values obtained through the measuring a parking time, measuring a relative humidity of outdoor air, and measuring a temperature of a disk exceed predetermined values, respectively.

The index may be a ratio of deceleration of a brake pedal effort in a normal state with respect to deceleration at a brake pedal effort in the sensitive brake environment.

The executing of the sensitive brake preventing mode may be performed with braking force with a predetermined decreased size in a jump-in section, in which braking force is momentarily and sharply increased when a brake pedal is stepped on.

An electromagnet may be disposed in a plunger in a booster of a brake apparatus and a permanent magnet may be mounted at an end part of an input shaft adjacent to the plunger, and the permanent magnet and the electromagnet may be arranged so that facing surfaces thereof have a same polarity, so that when a brake pedal is stepped on in the sensitive brake mode, a current is applied to a coil of the electromagnet, and the plunger is first in contact with a reaction disk of an output shaft by repulsive force by the same polarity, compared to a normal state, and thus the sensitive brake preventing mode is performed so that the braking force in the jump-in section is exhibited with a predetermined decreased size.

The sensitive brake preventing mode may be performed with decreased braking force by holding and postponing an opening of a solenoid IV value within an ESC by an ECU when the brake apparatus is controlled by the ESC and the ECU.

According to various aspects of the present invention an apparatus for preventing a sensitive brake in order to prevent exhibition of excessive braking force generated in a sensitive brake environment may include an electromagnet installed in a plunger in a booster of a brake apparatus so as to apply power in a sensitive brake mode, and a permanent magnet mounted at an end part of an input shaft disposed while being adjacent to the plunger and connected to a brake pedal, in which the permanent magnet and the electromagnet may be arranged so that facing surfaces thereof have the same polarity, and when a brake pedal is stepped on in the sensitive brake mode, a current may be applied to a coil of the electromagnet, and the plunger is first in contact with a reaction disk of an output shaft by repulsive force by the same polarity, compared to a normal state, and thus the braking force in the jump-in section of the braking force may be exhibited with a predetermined decreased size.

The method of preventing a sensitive brake of a vehicle according to the present invention detects sensitive brake environment elements, such as an outdoor temperature, a relative humidity of outdoor air, a parking time, and a temperature of a disk, and a condition of generating a sensitive brake is satisfied, it is determined that a sensitive brake is to be generated to exhibit jump-in braking force having a predetermined smaller size than that of jump-in braking force generally generated in a wheel caliper in response to a pedal effort of a driver, thereby preventing generation of a safe accident and maintaining a comfortable ride of a passenger. Further, the apparatus for preventing a sensitive brake of the present invention may be simply applied by installing a permanent magnet at an input shaft of a brake apparatus and installing an electromagnet at a plunger at a position facing the permanent magnet.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
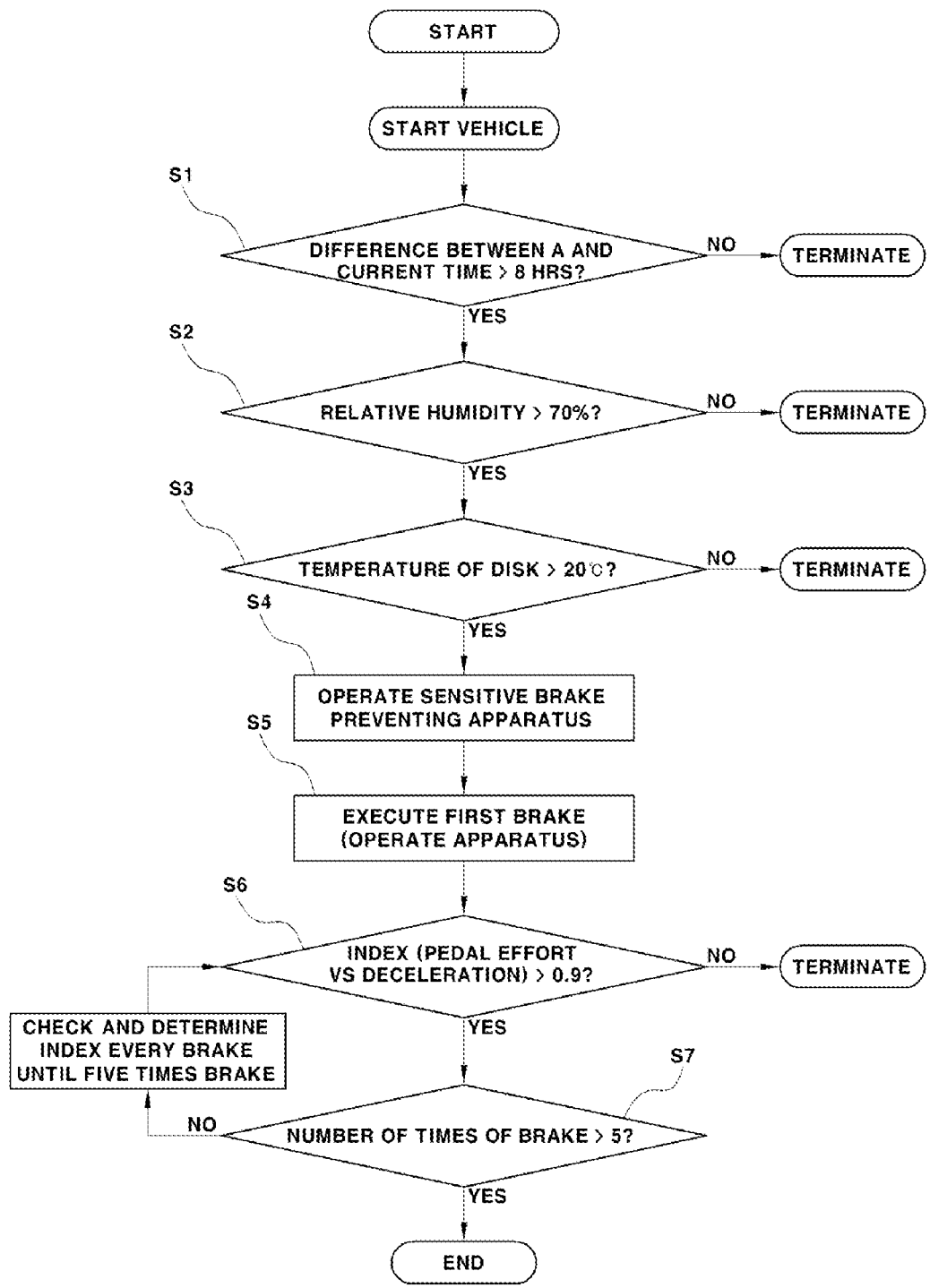
FIG. 1 is a flowchart of an operation for implementing an exemplary method of preventing a sensitive brake of a vehicle according to the present invention.

FIG. 1 is a flowchart of an operation for implementing a method of preventing a sensitive brake of a vehicle according to the present invention.

Operations for measuring elements for determining a sensitive brake environment of a vehicle includes measuring a parking time (operation S1), measuring an outdoor relative humidity (operation S2), and measuring a temperature of a disk (operation S3), and when all of the predetermined values, for example, the parking time of 8 hours or more, the relative humidity of 70% or more, and the temperature of the disk of 20° C. or lower, are satisfied in the respective operations, a brake apparatus is operated in a sensitive brake preventing mode (operation S4).

The numerical values in the conditions are simply illustrative, and depending on a size of braking force demanded according to a size of a vehicle, when the relative humidity is considerably larger than the reference value even though a parking time is short, when an outdoor temperature is low, and when values of the elements for determining the sensitive brake environment of a vehicle are different from the values of the aforementioned conditions, the sensitive braking mode may be operated, and the numerical values and reference values for the above conditions for operating the sensitive brake mode may be varied, so that it would be appreciated that the numerical values and the reference values may be set from much experimental data.

Next, a first brake is performed in the sensitive brake mode (operation S5), it is compared whether an index value of decoration to a pedal effort is larger than 0.9 (operation S6), and when the index value is smaller than 0.9, the brake is terminated, and when the index value is larger than 0.9, the brake is repeatedly performed in the sensitive brake mode of operation S4 (operation S7).

Figure 2:
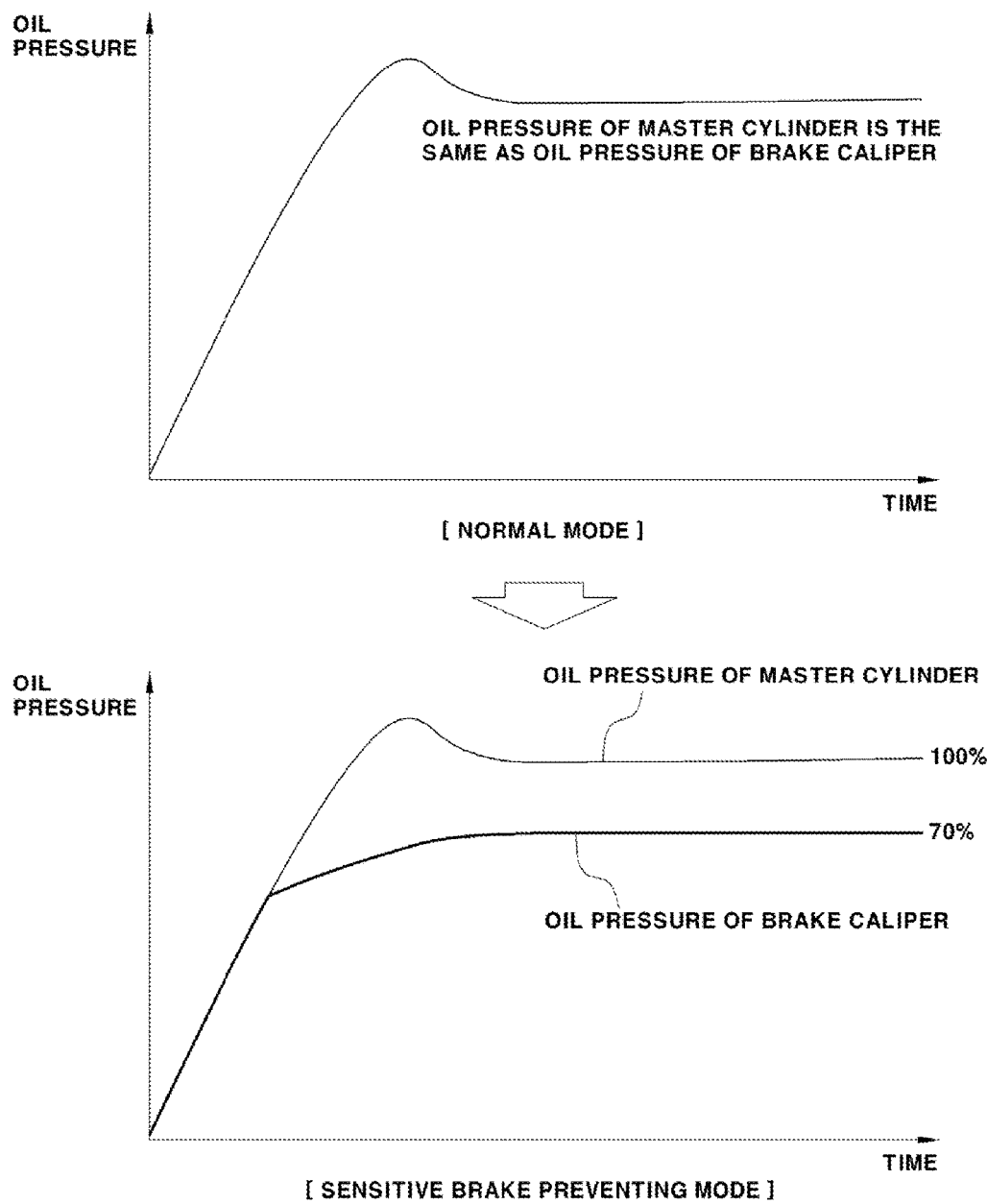
FIG. 2 is a graph illustrating an example of a decrease in an oil pressure supplied to a brake caliper in a sensitive brake preventing mode and a normal mode of FIG. 1.

The index is a ratio of deceleration of the pedal effort in a normal state of a brake, that is, an environment which does not correspond to the sensitive brake environment, with respect to deceleration at the pedal effort in the sensitive brake environment, and when a driver steps on the brake in the sensitive brake mode, the deceleration is pre-set to have about 70% of deceleration to a normal pedal effort of the brake as illustrated in FIG. 2. For example, when the index value is 0.9, deceleration by an increase in a friction coefficient after long parking has a value of 130% of a normal condition.

Further, typically, when the brake is performed several times, for example, the brake is performed about five times, a temperature of a friction material is increased by frictional heat between the friction material and the disk, and when moisture within the friction material is evaporated and the friction material has a normal friction coefficient, the index is smaller than 0.9, so that when the index value is larger than 0.9 after operation S6, the number of times of the brake repeated in the sensitive brake mode may also be pre-set as, for example, five times (operation S7).

The execution of the sensitive brake mode may be performed by two methods of changing a characteristic of the booster or decreasing an oil pressure to the caliper while the ESC performs a control, according to the brake apparatus of the vehicle.

Figure 3:
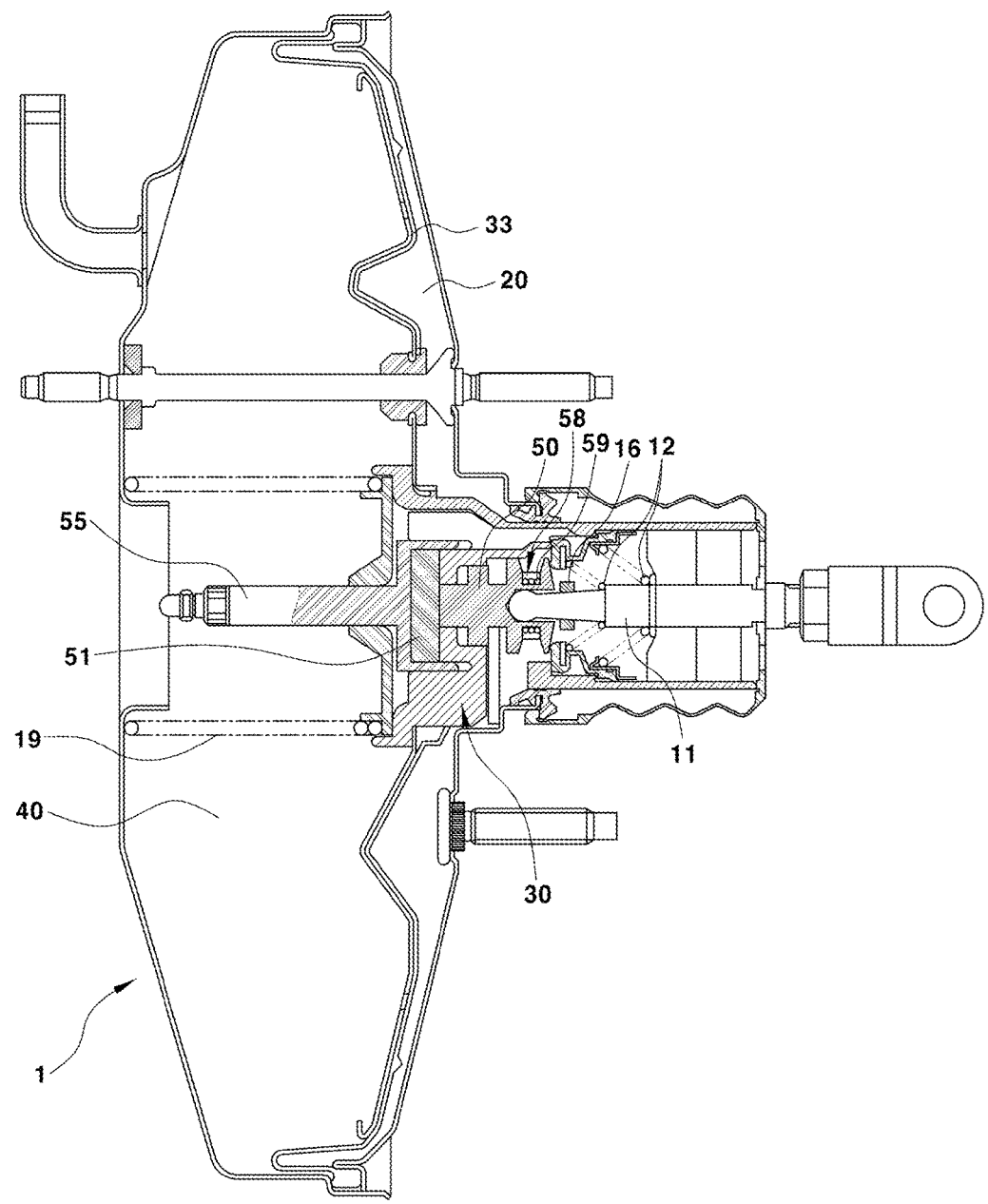
FIG. 3 is a diagram schematically illustrating an exemplary apparatus for preventing a sensitive brake installed in a booster in order to execute the sensitive brake preventing mode of FIG. 2.
Figure 4:
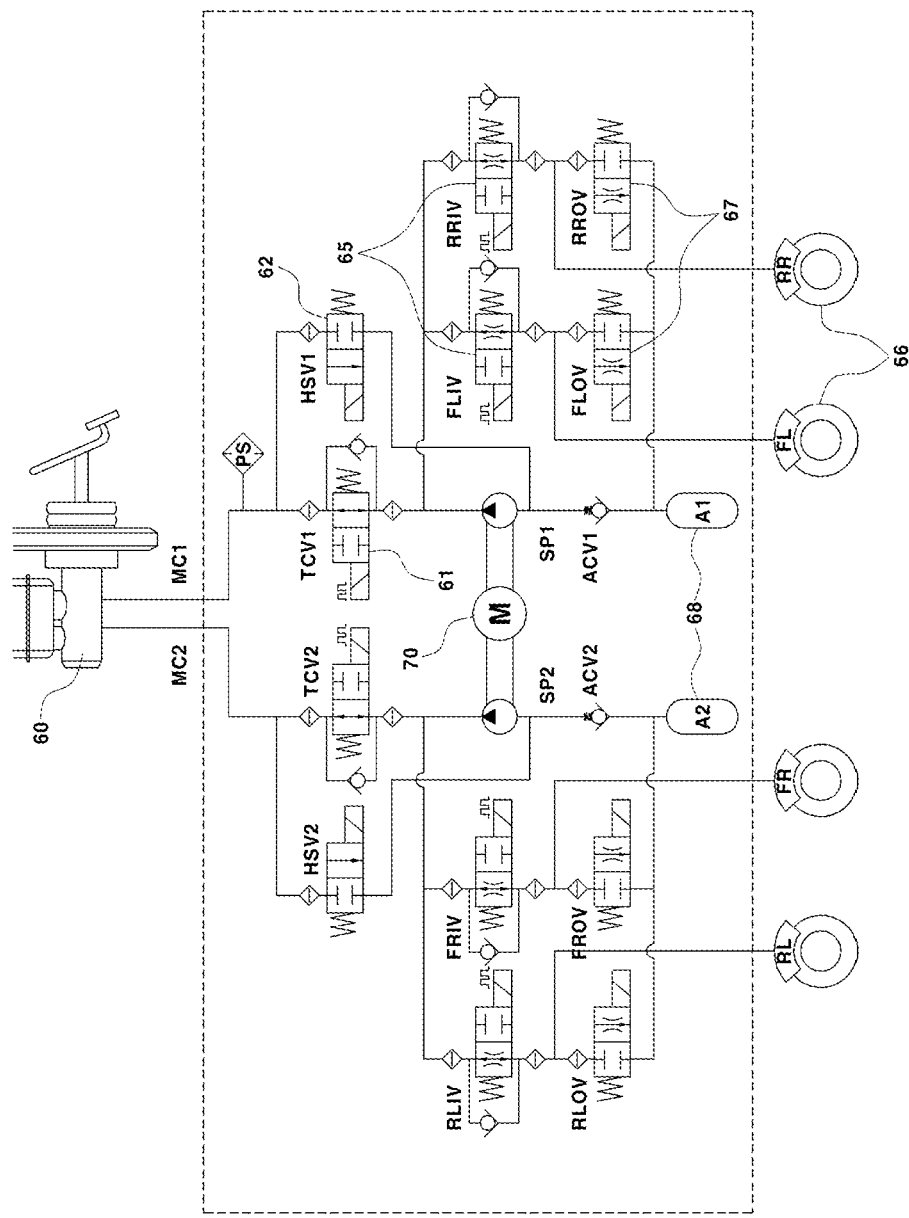
FIG. 4 is a diagram illustrating a case where the execution of the sensitive brake preventing mode of FIG. 2 is applied to a brake apparatus controlled by an ESC unit.

First, the case of changing the characteristic of the booster will be described with reference to FIG. 3. In general, when an input shaft 11 connected to a brake pedal is pushed in a booster 1, and a pedal effort is smaller than a reaction of the spring, a braking force cannot be substantially and properly exhibited, and when the pedal effort is larger than the reaction of the spring, outdoor air momentarily flows into a transformer room 20 and a diaphragm 33, in which a valve main body 30 is installed, moves toward a static pressure room, and thus an output shaft 55 moves, so that oil pressure is further formed in the master cylinder, and the oil pressure formed in the master cylinder is transmitted to the caliper to exhibit braking force. There exists a jump-in section, in which a booster output is increased without an increase in a pedal effort (within an increase in a booster input) before a plunger 50 is in contact with a reaction disk 51 and the reaction of a return spring 19 is sequentially transmitted to a reaction disk 51, a plunger 50, and the input shaft 11, and a value of the jump-in is determined by a gap between the plunger 50 and the reaction disk 51. For example, when the gap is large, a value of the jump-in is large, and when the gap is small, a value of the jump-in is small.

In typical, in the brake apparatus of a vehicle, when a driver steps on the brake pedal, jump-in braking force, which is momentarily and sharply increased, is executed, and then the braking force is increased at a constant inclination, and it is possible to prevent a sensitive brake by decreasing a size of the jump-in braking force to be smaller than that of a typical case, for example, about 30%.

In the apparatus for preventing a sensitive brake for implementing the sensitive brake preventing mode according to the present invention, an electromagnet 58 is installed in the plunger 50 and a permanent magnet 16 is mounted at an end part of the input shaft 11 adjacent to the plunger 50, and the permanent magnet 16 and the electromagnet 58 are arranged so that polarities of facing surfaces thereof are the same. When the driver steps the brake pedal in the sensitive brake mode, a current is applied to a coil 59 of the electromagnet 58 of the plunger 50, the plunger 50 is pushed toward the output shaft by repulsive force due to the same polarity as that of the permanent magnet 16 of the input shaft 11, so that the plunger is momentarily first opened in general, compared to a case where the plunger is opened by the input shaft, and the output shaft is pushed in advance. Accordingly, the output shaft momentarily and sharply moves when the plunger is opened by the movement of the input shaft by the pedal effort, so that a size of the sharply increasing and exhibited jump-in braking force is decreased, thereby preventing generation of excessive braking force.

In a modification, in order to execute the sensitive brake preventing mode in a case where the brake apparatus is controlled by the ESC unit, braking oil pressure holds and postpones the opening of a solenoid IV valve within the ESC through the ECU, so that the brake may be performed with finally decreased braking force.

That is, a TCV valve 61 is opened and an HSV valve 62 is closed during a general brake, and oil pressure of the master cylinder 60 by the pedal effort is supplied to a wheel caliper through the IV valves 65 at front and rear wheel sides and left and right wheel sides serially connected with the TCV valve, and in this case, a size of the braking force of the caliper 66 is decreased by holding and postponing the opening of the solenoid IV valve, so that the sensitive brake preventing mode is performed. During a sudden brake, oil pressure supplied by driving of a motor 70 and oil pressure of the master cylinder 60 by the pedal effort are combined and supplied, and the TCV valve 61 is closed and the HSV valve 62 is opened to quickly brake the wheel. The discharge of the oil pressure from the caliper 66 opens OV valves 67 at front-rear wheel sides and left-right wheel sides, so that the oil pressure of the caliper is discharged to a reservoir 68 to release the brake.

The present invention may be simply applied to an existing brake apparatus so as to prevent a sensitive brake by excessive braking force of a vehicle generated due to parking at night or humid weather to be used so as to reduce jump-in braking force in a brake apparatus and prevent a sensitive brake.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of preventing a sensitive brake for preventing an excessive brake of a vehicle, the method comprising:
   measuring conditions for determining a sensitive brake environment of the vehicle;
   terminating a brake when the conditions measured do not correspond to a preset sensitive brake environment, and when the conditions correspond to the sensitive brake environment, controlling a brake apparatus of the vehicle to be operated in a sensitive brake preventing mode;
   executing a first brake in a sensitive brake mode;
   comparing whether a value of an index of deceleration to a pedal effort at the first brake executed in the sensitive mode is larger than a predetermined value; and
   terminating the brake when the value of the index is smaller than the predetermined value, and repeatedly performing the brake in the sensitive brake mode when the value of the index is larger than the predetermined value.

2. The method of claim 1, wherein the conditions for determining the sensitive brake environment are determined according to whether measured values obtained through the measuring a parking time, measuring a relative humidity of outdoor air, and measuring a temperature of a disk exceed predetermined values, respectively.

3. The method of claim 1, wherein the index is a ratio of deceleration of a brake pedal effort in a normal state with respect to deceleration at a brake pedal effort in the sensitive brake environment.

4. The method of claim 1, wherein the executing of the sensitive brake preventing mode is performed with braking force with a predetermined decreased size in a jump-in section, in which braking force is momentarily and sharply increased when a brake pedal is stepped on.

5. The method of claim 1, wherein an electromagnet is disposed in a plunger in a booster of a brake apparatus and a permanent magnet is mounted at an end part of an input shaft adjacent to the plunger, and the permanent magnet and the electromagnet are arranged so that facing surfaces thereof have a same polarity, so that when a brake pedal is stepped on in the sensitive brake mode, a current is applied to a coil of the electromagnet, and the plunger is first in contact with a reaction disk of an output shaft by repulsive force by the same polarity, compared to a normal state, and thus the sensitive brake preventing mode is performed so that the braking force in the jump-in section is exhibited with a predetermined decreased size.

6. The method of claim 1, wherein the sensitive brake preventing mode is performed with decreased braking force by holding and postponing an opening of a solenoid IV value within an ESC by an ECU when the brake apparatus is controlled by the ESC and the ECU.

7. An apparatus for preventing a sensitive brake in order to prevent exhibition of excessive braking force generated in a sensitive brake environment, comprising:
   an electromagnet installed in a plunger in a booster of a brake apparatus so as to apply power in a sensitive brake mode; and
   a permanent magnet mounted at an end part of an input shaft disposed while being adjacent to the plunger and connected to a brake pedal,
   wherein the permanent magnet and the electromagnet are arranged so that facing surfaces thereof have the same polarity, and when a brake pedal is stepped on in the sensitive brake mode, a current is applied to a coil of the electromagnet, and the plunger is first in contact with a reaction disk of an output shaft by repulsive force by the same polarity, compared to a normal state, and thus the braking force in the jump-in section of the braking force is exhibited with a predetermined decreased size.

* * * * *